I. B. BOYCE.
Nut for Vehicle-Axles.

No. 208,667.  Patented Oct. 8, 1878.

WITNESSES  INVENTOR
Isaac B. Boyce
By his Att'ys.

UNITED STATES PATENT OFFICE.

ISAAC B. BOYCE, OF LYNN, MASSACHUSETTS.

IMPROVEMENT IN NUTS FOR VEHICLE-AXLES.

Specification forming part of Letters Patent No. 208,667, dated October 8, 1878; application filed July 29, 1878.

*To all whom it may concern:*

Be it known that I, ISAAC B. BOYCE, of Lynn, in the county of Essex and State of Massachusetts, have invented a new and useful Improvement in Nuts for Axles of Vehicles and other purposes, of which the following is a specification:

This invention relates particularly to axle-nuts for holding the wheels of vehicles upon their spindles, although it may be used in connection with suitable shafts, rods, spindles, &c., of various kinds and for different purposes.

The main object of this invention is to prevent any possibility of the loss of a nut, and hence the dropping of a wheel; and it is an improvement upon an invention for which I have recently applied for a patent, said application having been filed April 2, 1878.

The improvement consists in combining with the original nut and T-shaped bolt an additional screw-thread, the nut being made long enough for the purpose, into which the thread of the T-shaped bolt enters after passing the chamber in the nut. After the T-shaped bolt has entered this thread there will be a space left between the end of the bolt and the wall of the nut, or, if it be an open nut, the end of the bolt will be flush with the open end of the nut. The object is to provide additional stiffness and security to the spindle and nut, especially when they are required for use on heavy teams.

The nature of the improvement in detail is fully described below.

Figure 1:
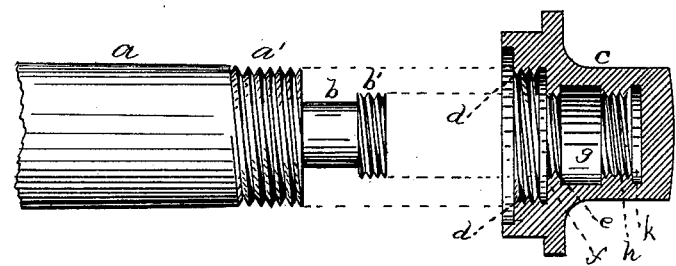
Figure 2:
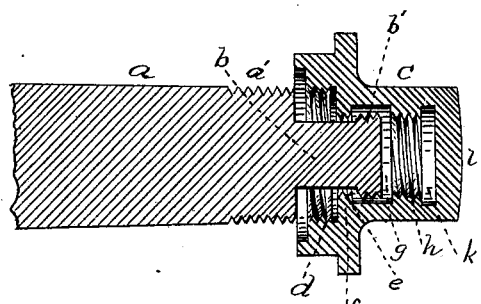
Figure 3:
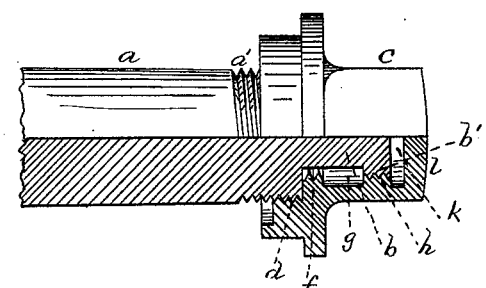

In the accompanying drawing, in which similar letters of reference indicate like parts, Figure 1 is a side elevation of the spindle and axle and a section of the nut embodying my improvement, the said axle and nut being detached. Fig. 2 is a longitudinal section of the same when the nut has become loose, but, by means of the construction of the device, cannot drop off. Fig. 3 is a view, part in section and part in elevation, of the spindle and nut in proper position.

The parts of the device shown which are not new in this improvement are the spindle $a$, provided with the screw-thread $a'$, the T-shaped bolt $b$, provided with the screw-thread $b'$ upon its thick portion and projecting from the spindle, the screw-thread $d$, near the entrance of the nut $c$, the bridge $f$, provided with the screw-thread $e$, and the chamber $g$ in said nut.

In the previous invention the nut was attached to the spindle by the thread $d$ engaging the thread $a'$ and the thread $e$ upon the bridge engaging the thread $b'$.

In attaching the nut, the part $b'$ of the T-shaped bolt passed into the chamber before the threads $a'$ and $d$ came into contact, and in case the nut became loose by the separation of the threads $d$ and $a'$, the thick end of the T-shaped bolt remained in the chamber $g$, which occupied the entire space between the bridge $f$ and the end wall of the nut, and by its rattling alarmed the occupants of the carriage without the nut disengaging itself.

My improvement consists in shortening or narrowing the chamber $g$ and placing screw-threads $h$ next beyond it, so that the thread $b'$, instead of remaining free in the chamber $g$ when the nut is in position, will engage the additional screw-thread $h$, as in Fig. 3. This will impart additional stiffness and strength in the case of large and heavy teams, as the nut is held in two places—viz., where the threads $a'$ and $d$ engage and where the threads $b'$ and $h$ engage. Of course, there is also less liability of unscrewing.

In screwing on the nut, as will be seen, first the threads $b'$ and $e$ engage, next the threads $a'$ and $d$, then, after the chamber $g$ is passed, the threads $b'$ and $h$ engage. If the nuts become loose by the disengaging of the threads $b'$ $h$ and $a'$ $d$, the T-shaped bolt rattles in the chamber $g$, as in Fig. 2, without allowing the nut to come off, the same as in the previous invention. A space, $k$, is usually left between the end of the T-shaped bolt and the end wall $l$ of the nut for dirt, &c.

Figure 4:
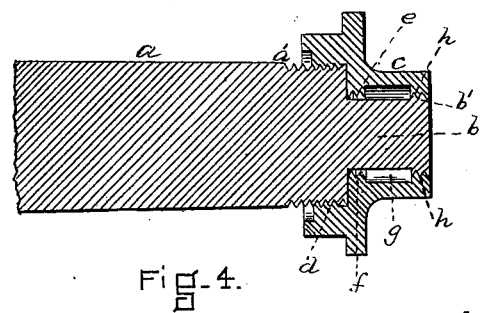

Fig. 4 is a sectional view of the spindle and nut, the latter being open, provided with the extra screw-thread $h$ above described, but having the end of the T-shaped bolt come flush with the end of the nut.

The principle of the improvement is the same, whether the nut be open or closed.

It will, of course, be understood that the chamber $g$ must be at least slightly longer than the thick end of the T-shaped bolt $b$.

Having thus fully described my improvement, what I claim, and desire to secure by Letters Patent, is—

In combination with the T-shaped bolt $b\ b'$ upon the spindle $a\ a'$, the nut $c$, when provided with the screw-thread $h$, in addition to the thread $e$ and chamber $g$, arranged and constructed substantially as herein set forth.

ISAAC B. BOYCE.

Witnesses:
 HENRY W. WILLIAMS,
 JAS. W. REED, Jr.